United States Patent
Kosiankowski et al.

(10) Patent No.: US 8,092,133 B2
(45) Date of Patent: Jan. 10, 2012

(54) DEVICE AND METHOD FOR MOUNTING OBJECTS ON A VEHICLE WALL

(75) Inventors: Leuder Kosiankowski, Jork (DE); Lutz Zeuner, Hardebek (DE); Hans-Peter Guthke, Buxtehude (DE)

(73) Assignee: Airbus Operations GmbH, Hamburg (DE)

(*) Notice: Subject to any disclaimer, the term of this patent is extended or adjusted under 35 U.S.C. 154(b) by 699 days.

(21) Appl. No.: 11/990,865

(22) PCT Filed: Aug. 21, 2006

(86) PCT No.: PCT/EP2006/065499
§ 371 (c)(1),
(2), (4) Date: Apr. 9, 2008

(87) PCT Pub. No.: WO2007/023144
PCT Pub. Date: Mar. 1, 2007

(65) Prior Publication Data
US 2009/0136321 A1    May 28, 2009

Related U.S. Application Data

(60) Provisional application No. 60/822,517, filed on Aug. 16, 2006.

(30) Foreign Application Priority Data

Aug. 23, 2005   (DE) .......................... 10 2005 040 019

(51) Int. Cl.
*F16B 39/36*    (2006.01)
(52) U.S. Cl. ........................ 411/270; 411/433
(58) Field of Classification Search ............ 411/266, 411/267, 270, 433, 437
See application file for complete search history.

(56) References Cited

U.S. PATENT DOCUMENTS

| 730,599 | A | * | 6/1903 | Bartley | 411/270 |
| 786,725 | A | * | 4/1905 | Bryce | 411/266 |
| 2,355,115 | A | * | 8/1944 | Schmidt | 248/74.3 |

(Continued)

FOREIGN PATENT DOCUMENTS

DE    1 983 834    4/1968

(Continued)

OTHER PUBLICATIONS

International Search Report for PCT/EP2006/065499.

(Continued)

*Primary Examiner* — Flemming Saether
(74) *Attorney, Agent, or Firm* — Jenkins, Wilson, Taylor & Hunt, P.A.

(57) ABSTRACT

The invention relates to a retaining device for retaining objects on a vehicle wall, comprising: a supporting element (4) for placing on a front side (2) of the wall (1) with devices (5) for retaining one or a plurality of objects (6) and a fastening element (8, 9) for locking the supporting element (4) on a rear side (3) of the wall (1), as well as a method for mounting objects with this retaining device. In order to reduce the installation cost, and in order not to be dependent on the supporting wall thickness, the fastening element (8) is pin-shaped and has a head (9) at one end so that it can be inserted through an opening (7) in the wall (1) and can be prevented against sliding out in one direction, and the supporting element (4) comprises a connecting device (13) with which the supporting element (4) can be solidly connected to the fastening element (8) projecting from the front side (2) of the wall.

8 Claims, 3 Drawing Sheets

U.S. PATENT DOCUMENTS

| | | | | | |
|---|---|---|---|---|---|
| 2,361,979 | A | * | 11/1944 | Tarwater et al. | 411/266 |
| 2,622,649 | A | * | 12/1952 | Hunter | 411/270 |
| 3,695,139 | A | * | 10/1972 | Howe | 411/432 |
| 4,071,158 | A | * | 1/1978 | Maheu | 220/3.2 |
| 4,934,889 | A | * | 6/1990 | Kurosaki | 411/433 |
| 4,974,888 | A | * | 12/1990 | Childers | 292/251 |
| 5,081,811 | A | * | 1/1992 | Sasaki | 52/223.13 |
| 2005/0008456 | A1 | | 1/2005 | Birkelbach et al. | |

FOREIGN PATENT DOCUMENTS

| | | |
|---|---|---|
| DE | 30 00 208 | 7/1980 |
| DE | 31 43 775 | 5/1983 |
| DE | 196 50 960 | 6/1998 |
| DE | 198 31 368 | 1/2000 |
| FR | 2 765 280 | 12/1998 |

OTHER PUBLICATIONS

German examination report dated Aug. 3, 2010 for DE 10 2005 040 019.1.

* cited by examiner

DEVICE AND METHOD FOR MOUNTING OBJECTS ON A VEHICLE WALL

CROSS REFERENCE TO RELATED APPLICATION

This application is the U.S. National phase of International Application No. PCT/EP2006/065499 filed 21 Aug. 2006 which designated the U.S. and claims priority to German Patent Application No. 102005040019 filed 23 Aug. 2005, the entire contents of each of which are hereby incorporated by reference.

TECHNICAL FIELD

The invention relates to the fastening of parts or components, such as electrical cables and light wave conductors, in a vehicle, and in particular to the fastening of pipes, cables, hoses or the like on a sheet metal section of a body of a vehicle by means of a retaining device. The invention relates in particular to a retaining device for retaining one or a plurality of objects on a vehicle wall according to the preamble of claim 1 and to a method of mounting one or a plurality of objects on a vehicle wall according to the preamble of claim 11.

The invention relates to the fastening of parts or components, such as electrical cables and light wave conductors, in a vehicle, and in particular to the fastening of pipes, cables, hoses or the like on a sheet metal section of a body of a vehicle by means of a retaining device. The invention relates in particular to a retaining device for retaining one or a plurality of objects on a vehicle wall according to the preamble of claim 1 and to a method of mounting one or a plurality of objects on a vehicle wall according to the preamble of claim 11.

BACKGROUND

In conventional vehicles cable retaining devices are used for mounting and guiding electrical and other cable routes, pipes etc. in the different regions. Retaining devices of plastic are preferred here because of their low dead weight. The retaining devices are adapted to the specific conditions for connection to the structural component concerned, i.e. the bracket or frame. A screw-nut connection is often used for this purpose.

In conventional vehicles cable retaining devices are used for mounting and guiding electrical and other cable routes, pipes etc. in the different regions. Retaining devices of plastic are preferred here because of their low dead weight. The retaining devices are adapted to the specific conditions for connection to the structural component concerned, i.e. the bracket or frame. A screw-nut connection is often used for this purpose.

DE 196 50 960 A1 discloses a method for fastening a part or a component, e.g. a cable, pipe, line, hose or the like to a sheet metal section of a body for automobiles by means of a plastic fastener. The method comprises the steps of forming a fastening hole in the section for the vehicle body shell and inserting an adapter section in the fastening hole of the shell. The adapter section consists of a plastic material which is essentially dimensionally stable at higher temperature, e.g. at 180° or more, and is fitted in the fastening hole so that it is largely gas-tight. The adapter section is protected from being pulled out by means of an undercut. This section has an adapter head which can be connected to the head of a retaining section for the part to be fastened by means of a snap connection. The head of the retaining section is connected to the head of the adapter section after the sheet steel section of the body is painted.

The retaining devices of prior art suffer from the disadvantage that modifications to the structural elements generally involve expensive and time-consuming modifications to the retaining device. This is particularly applicable when plastic retaining devices have to be adapted and modifications to the injection moulding tools used for their manufacture are required.

In view of these modifications and the structural elements not defined in detail, there is a demand for a support which can be used on brackets with different material thicknesses and can be quickly secured.

SUMMARY

The object of this invention is to provide a device for retaining one or a plurality of objects to a vehicle wall, and to indicate a method for fitting such a retaining device on the vehicle wall, where the installation cost is reduced and where the device and method are dependent on the supporting wall thickness.

The object of this invention is to provide a device for retaining one or a plurality of objects to a vehicle wall, and to indicate a method for fitting such a retaining device on the vehicle wall, where the installation cost is reduced and where the device and method are dependent on the supporting wall thickness.

This object is achieved according to the invention by the retaining device for retaining one or a plurality of objects on a vehicle wall according to claim 1 and by the method for mounting one or a plurality of objects on a vehicle wall according to claim 11. Preferred embodiments of the invention constitute the object of the dependent claims.

The basic concept of the invention is to construct the retaining device from three parts, namely a (conical) connecting device, a clamping piece which is preferably provided with sheet metal inserts, and a locking ring. These three elements together ensure that the retaining device is securely connected to the bracket. For fastening the retaining device this connection is pushed as far as the stop onto a fastening element, i.e. a screw or mating support piece, which is in turn secured to or on the bracket. The retaining device is locked independently by then rotating the retaining device a few degrees about its own axis, the connecting device cuts into the screw. Because of the rotation the clamping piece also moves downwards in the direction of the fastening element. Due to this downward movement the conical clamping piece is compressed more tightly in a preferred embodiment, and the thread of the fastening element cuts even more into the clamping piece so that the connection between the two is even more stable. The locking ring serves as a device for preventing the clamping piece from being displaced when the retaining device is placed and pushed onto the fastening element.

Correspondingly the retaining device according to the invention comprises a supporting element for retaining one or a plurality of objects on a vehicle wall, which element is placed on a front side of the wall, with devices for retaining one or a plurality of objects and a fastening element for locking the supporting element on a rear side of the wall, characterised in that the fastening element is pin-shaped and has a head at one end so that it can be pushed through an opening in the wall and is protected against sliding out in one direction, and in that the supporting element comprises a connecting device with which the supporting element is solidly connected to the fastening element projecting from the front side of the wall.

The support according to the invention has one or—if possible—a plurality of the following characteristics: the connecting device is arranged in a cavity in the supporting element so that it moves axially, the cavity having an opening on a front face of the supporting element through which the fastening element projecting from the front side of the wall can be inserted in the cavity; the fastening element has a male thread and the connecting device comprises a clamping piece for making a screw connection to the fastening element, the clamping piece being arranged in a fixed position in the cavity in the direction of rotation;

the clamping piece has a hole whose diameter in at least one constricted section that is slightly smaller than the outside diameter of the fastening element, so that when the fastening element is pushed through the clamping piece the fastening element makes a solid connection to the clamping piece in at least one of the constricted sections;

the clamping piece has a vertical slot through which the hole is opened laterally in the radial direction;

in at least one of the constricted sections of the clamping piece is arranged at least one sheet metal disc with a hole, this sheet metal disc having an opening slot through which the hole is opened in the radial direction at least one point;

at least three sheet metal disc segments are arranged so that they are able to move relative to each other in a 120° symmetry in at least one of the constricted sections of the clamping piece;

the clamping piece is conical and the cavity expands conically, at least in sections, from the opening and displacement of the clamping piece in the cavity beyond the locking ring is prevented;

the clamping piece has at least three guide devices which extend essentially in the axial direction and prevent rotation of the clamping piece about the central axis.

In particular, the support can be equipped with different devices for retaining one or a plurality of objects on the supporting elements, which enables it to be used universally.

The method according to the invention for mounting one or a plurality of objects on a vehicle wall, which comprises: a supporting element for placing on a front side of the wall, with devices for retaining one or a plurality of objects and a fastening element for locking the supporting element on a rear side of the wall, which involves the following steps: forming a fastening hole in the vehicle wall, inserting the fastening element in the fastening hole, the fastening element being prevented from sliding out of the fastening hole in one direction by a head, is characterised by the following steps: placing the supporting element on the fastening element and pressing it as far as the stop onto the vehicle wall and rotating the supporting element about the axis of symmetry of the fastening element, so that the fastening element projecting from the front side of the wall and the attached part are solidly connected together.

One advantage of the invention consists in the fact that considerable time is saved in assembly because of simplified handling by the retaining device according to the invention. A further advantage is that because of this design only one general retaining device is required, with benefits in terms of storage, development, design and tool costs. Due to the conical quick-release closure the retaining device may also be used for all material strengths.

BRIEF DESCRIPTION OF THE DRAWINGS

Further characteristics and advantages of the invention are evident from the following description of preferred exemplary embodiments in which reference is made to the attached drawing.

Further characteristics and advantages of the invention are evident from the following description of preferred exemplary embodiments in which reference is made to the attached drawing.

The representation in the drawings is not to scale. Similar or similarly acting elements are provided with the same reference numbers.

FIG. 1 shows an embodiment of the retaining device according to the invention for retaining one or a plurality of objects on a vehicle wall. Pipes, cables, hoses, light and other wave conductors with any cross-section are intended to be secured to a wall by means of this retaining device so that they are located above the front side 2 of the wall. It is assumed here that the thickness of the wall is not excessive, so that fastening element can be inserted through the wall from the rear side 3 of wall 1. Supporting element 4 is then fixed to the wall with the fastening element.

DETAILED DESCRIPTION

Figure 1:
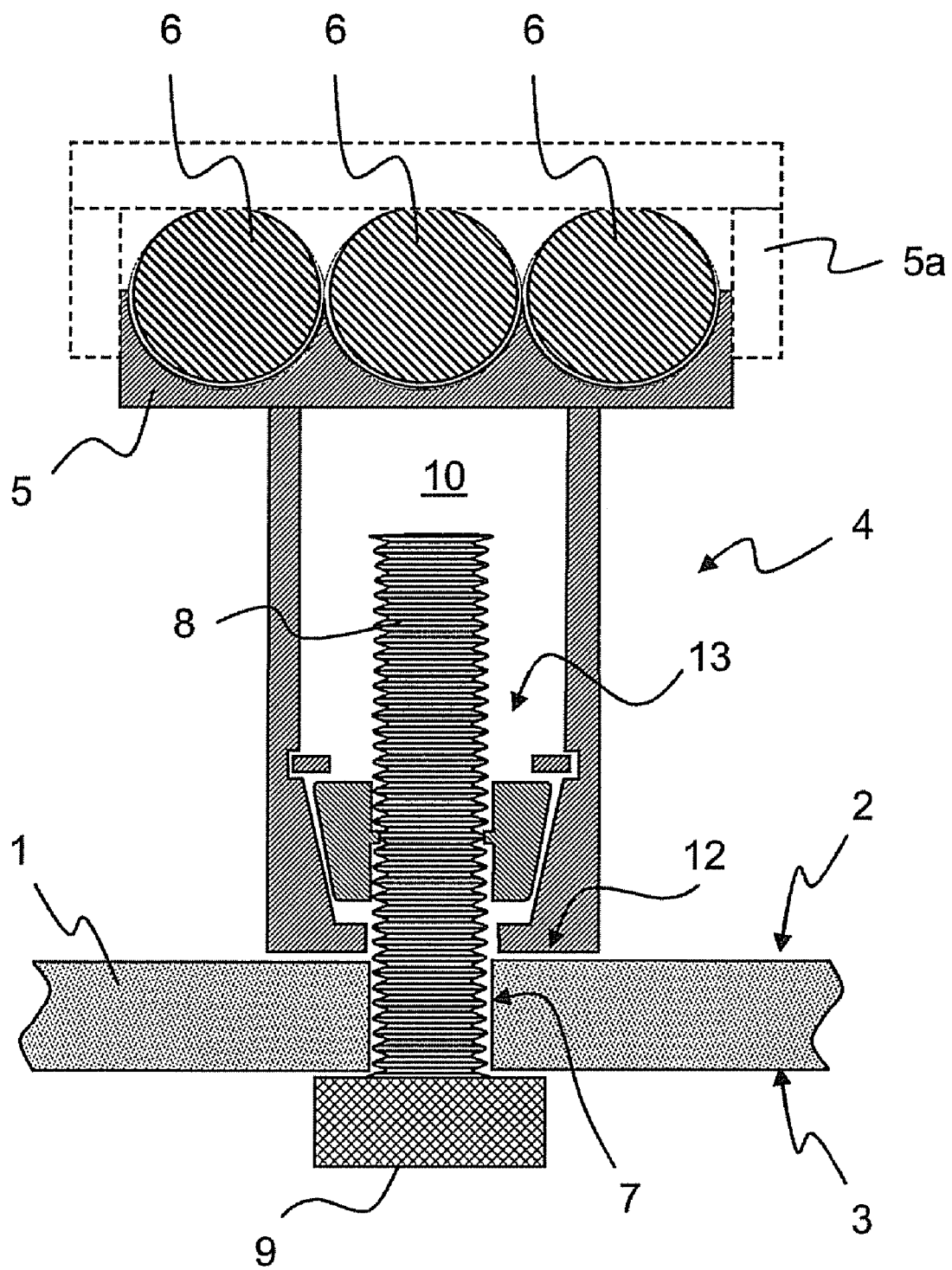
FIG. 1 shows a cross-section through an embodiment of the retaining device according to the invention.

FIG. 1 shows an embodiment of the retaining device according to the invention for retaining one or a plurality of objects on a vehicle wall. Pipes, cables, hoses, light and other wave conductors with any cross-section are intended to be secured to a wall by means of this retaining device so that they are located above the front side 2 of the wall. It is assumed here that the thickness of the wall is not excessive, so that fastening element can be inserted through the wall from the rear side 3 of wall 1. Supporting element 4 is then fixed to the wall with the fastening element.

The retaining device comprises a supporting element 4, for placing on front side 2 of wall 1. Supporting 4 comprises in turn devices 5 for retaining pipes, cables, hoses, light and other wave conductors 6, which may have any cross-section. The pipes, cables, hoses, light and other wave conductors 6 are, in particular, retained by a strap 5a or the like on supporting element 4. Strap 5a is of no importance for an understanding of the invention, and is therefore represented by a dotted line.

The retaining device also comprises a fastening element 8 for holding together or locking supporting element 4. The fastening element consists of a pin-shaped part 8 and a head 9 whose diameter is greater than that of the pin-shaped part 8. Pin-shaped part 8 of the fastening element is inserted in wall 1 through an opening 7. The fastening element is prevented from sliding out in one direction by head 9. Pin-shaped part 8 is connected to supporting element 4, so that wall 1 is clamped between head 9 on rear side 3 of wall 1 and supporting element 4 on front side 2 of wall 1.

In order to make the actual connection between supporting element 4 and fastening element 8, supporting element 4 comprises a connecting device 13 in a cavity 10 of supporting element 4. Connecting device 13 cannot leave cavity 10 in supporting element 4. Supporting element 4 is connected solidly to fastening element 8 projecting from front side 2 of wall 1 by means of connecting device 13. For this purpose a substantial part of fastening element 8 extends through fastening hole 7 in wall 1 and through an opening 11 in cavity 10, in which connecting device 13 is located, into cavity 10. Opening 11 is arranged in front face 12 of supporting element 4.

The structure and mode of operation of connecting device 13 in cavity 10 of supporting element are explained with reference to the embodiment shown in FIG. 2. For this purpose FIG. 2 shows the lower part of supporting element 4 on an enlarged scale.

Connecting device 13 comprises a clamping body or clamping piece 14. Clamping piece 14 is freely movable in the axial direction in cavity 10, i.e. from top to bottom in the drawing. Its upward movement, i.e. away from opening 11 in cavity 10, is limited only by a locking ring 17 which is arranged for this purpose in a corresponding groove 17*a* along the circumference of the inner wall of cavity 10.

Clamping piece 14 has a hole 15 which is coaxial with the axis of symmetry of clamping piece 14 and through which extends fastening element 8. In order to make a solid connection between fastening element 8 and clamping piece 14, fastening element 8 has a structured surface, which constitutes a screw thread. Clamping piece 14 has a constricted section 16 with which the structured surface of fastening element 8 enters into a friction connection.

Figure 2:
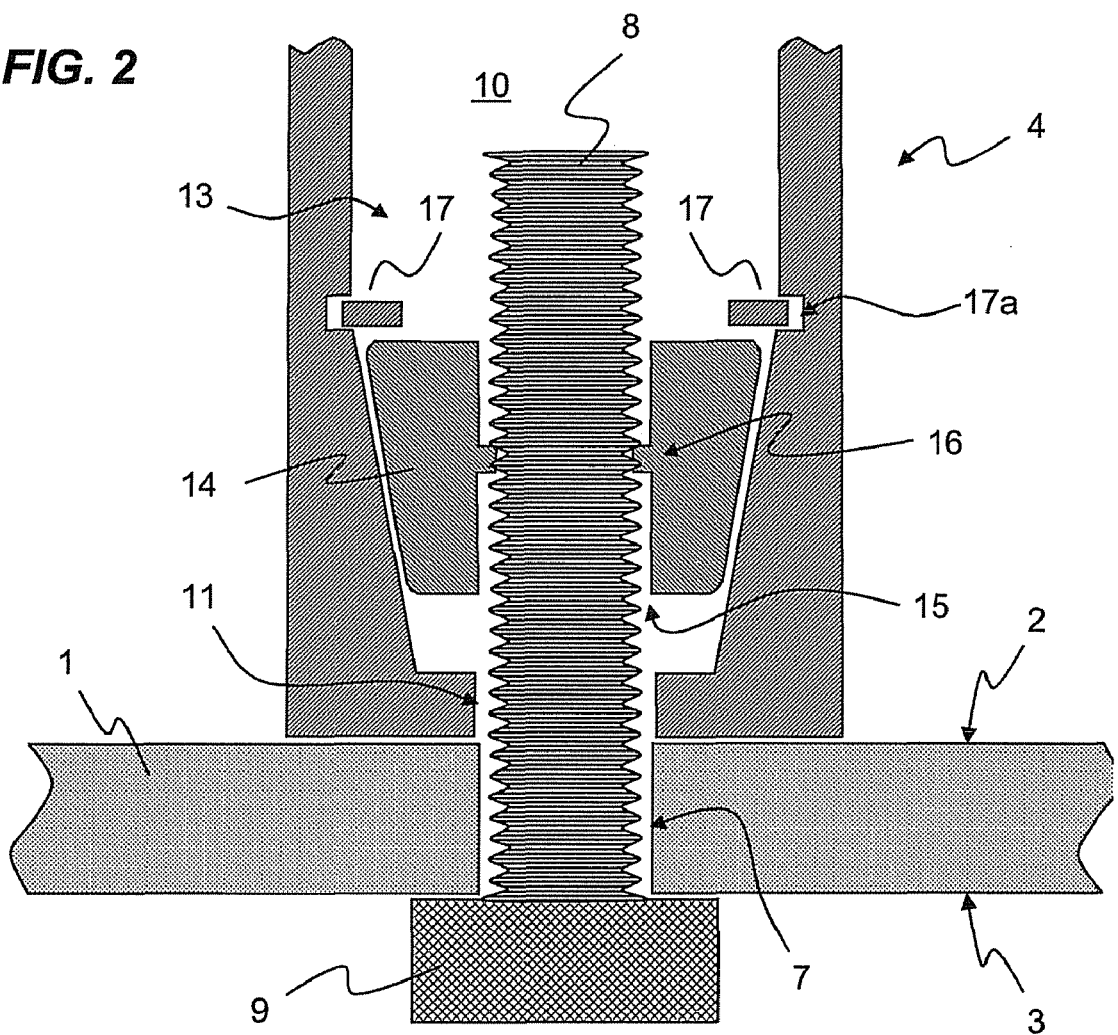
FIG. 2 shows an enlarged section of FIG. 1.

When fastening element 8 is inserted through clamping body 14 the latter is pushed upwards because of the friction between the structured surface of fastening element 8 and constricted section 16 of clamping body 14 in FIG. 2. Clamping body 14 escapes this force until it reaches a stop level with locking ring 17, and its further movement is stopped. When fastening element 8 is further advanced and—against the frictional force—is pushed through clamping body 14 into cavity 10, the distance between head 9 of fastening element 8 and constriction 16 in clamping body 14 becomes increasingly shorter. This process ends when supporting element 4 and head 9 rest on wall 1. Supporting element 4 cannot then be moved further downwards in the direction of fastening element 8.

When this point is reached, however, there is still a certain clearance in terms of the distance of supporting element 4 from wall 1. This clearance is provided in that clamping piece 14 in cavity 10 can be moved upwards and downwards. Now if supporting element 4 is pulled it is therefore easily loosened a small distance from the front surface 2 of the wall. This would result in supporting element 4 not sitting stably on wall 1. To eliminate this residual clearance in terms of the distance of supporting element 4 from wall 1, a rotary movement of fastening element 8 relative to clamping piece 14 is now performed about the common axis of symmetry. If the surface structure of fastening element 8 is a thread, it cuts into constricted section 16. As a result of this, in a suitable direction of rotation, clamping body 14 is moved by the rotary movement in the direction of head 9 and hence as far as opening 11 in cavity 10. This movement does not cease until the rotation is completed, in particular because the torque to be applied would have to exceed a certain limit value for the rotation to continue.

It is self-evident to the person skilled in the art that in order to support the rotary movement head 9 and/or supporting element 4 is/are provided with suitable devices (not shown) that enable the rotation to be performed or tools to be attached, e.g. roughening head 9 in the manner of a knurled screw for the rotation to continue.

In order to increase efficiency when making the screw connection between fastening element 8 and clamping body 14, the latter is conical in shape so that its narrow end lies on the side of opening 11 and its wide end lies on the side of device 5 for the cables etc.

The operation of this embodiment of clamping piece 14 is explained in the following with reference to FIG. 3.

Figure 3:
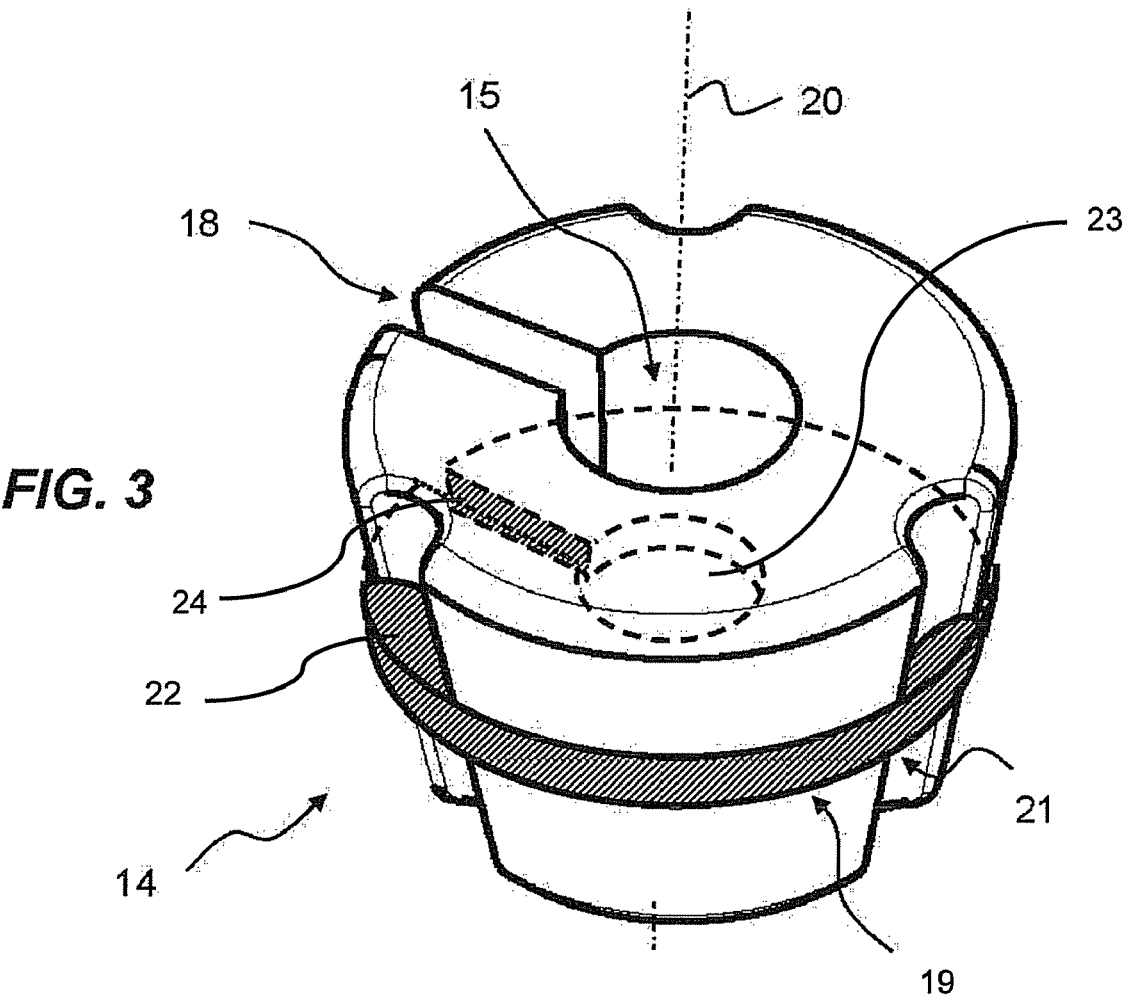
FIG. 3 shows the perspective view of an embodiment of the clamping piece according to the invention.

FIG. 3 shows clamping body 14 in a perspective view. FIG. 3 illustrates a sheet metal disc 22 inserted into a slot 19 of clamping body to form the constriction section. In the alternative, clamping body 14 may comprise the constricted section 16 as previously described. As can be seen, clamping body 14 is essentially a block with a central hole 15, which runs coaxially with plane of symmetry 20 of the block. When the retaining device is assembled hole 15 receives fastening element 8 (not shown). Hole 15 has a diameter which is preferably slightly smaller in diameter than constricted section 16 (e.g., where section 16 is used, see FIGS. 1 and 2) than the outside diameter of fastening element 8. Fastening element 8 is therefore solidly connected to clamping piece 14.

In the embodiment shown in FIG. 3 block 14 has a vertical slot 18 through which hole 15 is laterally opened. This enables clamping body 14 to be compressed to a greater or lesser extent in such a manner that its circumference varies correspondingly in the plane perpendicular to axis of symmetry 20.

In particular, if clamping body 14 is now pulled downwards by a force, i.e. in the direction of its narrow side, the inside diameter of cavity 10 is similarly reduced. This compresses clamping body 14, and vertical slot 18 becomes narrow and the compressive force of clamping body 14 exerted on fastening element 8 (not shown) is therefore increased. Consequently the connection between fastening element 8 is rendered increasingly stable, particularly in constricted section 16 (not shown), and the force exerted downwards may therefore also be increased without this resulting in slipping. Clamping piece 4 cuts increasingly into fastening element 8.

The condition for the mode of operation of clamping body 14, interacting with fastening element 8, explained above, is that the clamping body must be fixed relative to supporting element 4 in relation to a rotation about axis 20. This is achieved in the embodiment shown by guide devices 21. Clamping piece 14 preferably has at least three guide devices 21. These extend essentially in the axial direction and prevent rotation of clamping piece 14 about central axis 20. In the embodiment shown guide devices 21 consist of grooves or channels in clamping body 14. These interact with projections or rails (not shown) on the inner wall of cavity 10, in which clamping body 14 is located so that it is able to move in an axial direction. Grooves 21 and the rails (not shown), which engage in grooves 21, ensure that clamping piece 14 is able to move axially unhindered, but is fixed in the direction of rotation.

Constriction 16 in hole 15 may be made from the same material as clamping body 14, which has the advantage that the entire clamping piece 14 can be manufactured in one piece.

Figure 4:
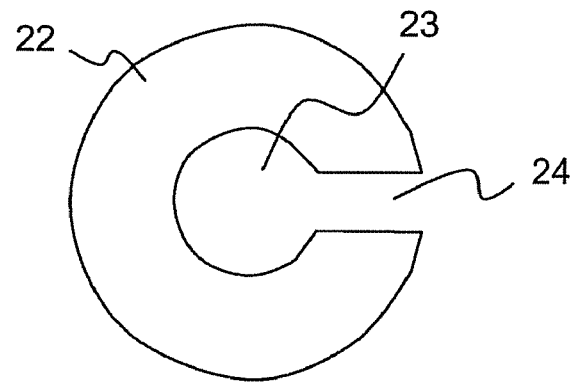
FIG. 4 shows a sheet metal disc for use in the clamping piece according to this invention, in elevation.

As shown in FIG. 3, sheet metal disc 22 can be inserted in a horizontal slot 19 in clamping body 14 and comprises constriction 16 section. Horizontal slot 19 is shown in FIG. 3. Sheet metal disc 22 is explained in the following with reference to FIG. 4, which shows an embodiment of the sheet metal disc which, in the centre, has a hole 23 through which fastening element 8 (not shown) is pushed, rubbing on sheet metal disc 22. When sheet metal disc 22 rotates relative to fastening element 8, the thread of fixing element 8 cuts into sheet metal disc 22. Because of the rotary movement a linear movement of sheet metal disc is then produced along axis of symmetry 20, which in turn forces clamping body 14 to move axially downwards in cavity 10 of supporting element 4, as already described above.

Similarly to vertical slot 18 of clamping piece 14, sheet metal disc 22 has an opening slot 24 which essentially overlaps vertical slot 18 of clamping piece 14. Because of opening slot 24 sheet metal disc 22 is rendered more flexible to facilitate pushing fastening element 8 through hole 23 whilst sheet metal 22 is simultaneously pressed against fastening element 8.

To make constriction 16 even more flexible, a structure consisting of three sheet metal disc segments can be used instead of sheet metal disc 22 with opening slot 24, which segments are inserted independently from each other in horizontal slot 19 of clamping piece 14. This embodiment is explained in the following with reference to FIG. 5.

Figure 5:
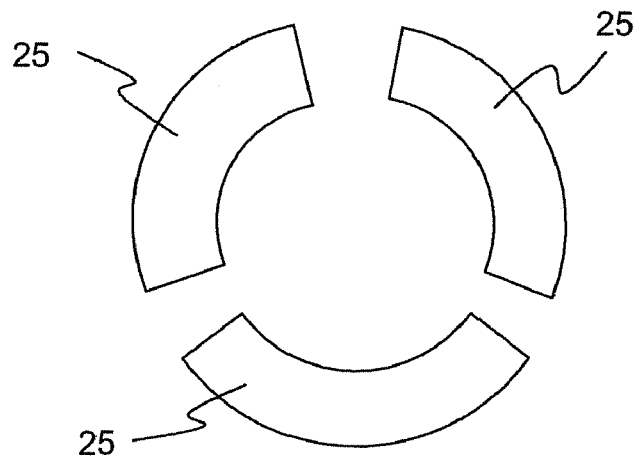
FIG. 5 shows an embodiment of the sheet metal segments for use in the clamping piece according to this invention, in elevation.

FIG. 5 shows three sheet metal segments 25, each of which cover an angle of approx. 120°. It is obvious to the person skilled in the art that more than three sheet metal segments and other angles can also be used. Segments 25 are inserted individually in horizontal slot 19 of clamping piece 14 and there retained by locking means, not shown, and pushed in the direction of the centre of hole 15 in clamping piece 14. Otherwise the mode of operation is identical to that described above in connection with sheet metal disc 22.

In order to mount one or a plurality of objects on a vehicle wall fastening hole 7 is formed in wall 1, according to the invention, and fastening element 8 is inserted in fastening hole 7. Here fastening element 8 is prevented by head 9 from sliding out of fastening hole 7 in one direction. Supporting element 4 is then placed on fastening element 8 and is pressed against wall 1 as far as the stop. Finally supporting element 4 is rotated about central axis 20 of fastening element 8, so that fastening element 8 projecting from the front side of the wall and connecting device 13 are solidly connected.

Reference Numbers

1 Wall
2 Front side of the wall
3 Rear side of the wall
4 Supporting element
5 Devices for retaining the cables, 5a Fastening strap
6 Cables, fastening objects
7 Fastening hole
8 Fastening element
9 Head of fastening element
10 Cavity in supporting element
11 Opening of cavity
12 Front face of the supporting element
13 Connecting device
14 Clamping piece
15 Hole in the clamping piece
16 Constricted section in clamping piece
17 Locking ring, 17a Groove along the circumference of the inner wall of cavity 10
18 Vertical slot in clamping piece
19 Horizontal slot in clamping piece
20 Central axis
21 Guide devices
22 Sheet metal disc
23 Hole in sheet metal disc
24 Opening slot in sheet metal disc
25 Sheet metal disc segment

The invention claimed is:

1. A retaining device for retaining one or a plurality of objects on a vehicle wall, comprising:
   a supporting element for placing on a front side of the wall with devices for retaining one or a plurality of objects, the supporting element comprising a connecting device with which the supporting element is solidly connected to a fastening element projecting from the front side of the wall; and
   the fastening element for locking the supporting element on the front side of the wall, wherein the fastening element is pin-shaped and has a head at one end so that it can be pushed through an opening in the wall and is prevented from sliding out in one direction;
   wherein the connecting device is arranged so that it moves axially in a cavity in the supporting element, wherein the cavity has an opening on a front face of the supporting element through which opening the fastening element projecting from the front side of the wall can be inserted in the cavity;
   wherein the fastening element has a male thread and the connecting device comprises a clamping piece for making a screw connection to the fastening element, wherein the clamping piece is arranged in the cavity so that it is fixed in the direction of rotation; and
   wherein at least one constricted section of the clamping piece comprises a sheet metal disc with a hole arranged essentially perpendicular to the axis of symmetry of the clamping piece, wherein the sheet metal disc has an opening slot through which the hole is opened at at-least one point in the radial direction.

2. The device according to claim 1, wherein the diameter of said hole is smaller than an outside diameter of the fastening element.

3. The device according to claim 2, wherein the clamping piece has a vertical slot through which a centrally disposed hole is laterally opened throughout its length in the radial direction.

4. The device according to claim 1, wherein the at least one constricted section of the clamping piece comprises at least three sheet metal disc segments arranged so that they can move freely in relation to each other in a 120° symmetry.

5. The device according to claim 1, wherein the clamping piece is conical and the cavity is conically expanded, at least in sections, from the opening, so that when the clamping piece moves towards the opening the vertical slot is compressed.

6. The device according to claim 1, wherein a locking ring is arranged in the cavity in such a manner that the clamping piece is located between the locking ring and the opening on the front side of the supporting element and so that a displacement of the clamping piece in the cavity beyond the locking ring is prevented.

7. The device according to claim 1 wherein the clamping piece has at least three guide devices which extend essentially in the axial direction and prevent rotation of the clamping piece about the central axis.

8. A retaining device for retaining one or a plurality of objects on a vehicle wall, comprising:
   a supporting element for placing on a front side of the wall with devices for retaining one or a plurality of objects, the supporting element comprising a connecting device with which the supporting element is connected to the fastening element projecting from the front side of the wall; and
   a fastening element for locking the supporting element on the front side of the wall, wherein the fastening element is pin-shaped and has a head at one end so that it can be pushed through an opening in the wall and is prevented from sliding out in one direction;

wherein the connecting device is arranged so that it moves axially in a cavity in the supporting element, wherein the cavity has an opening on a front face of the supporting element through which opening the fastening element projecting from the front side of the wall can be inserted in the cavity;

wherein the fastening element has a male thread and the connecting device comprises a clamping piece for making a screw connection to the fastening element, wherein the clamping piece is arranged in the cavity so that it is fixed in the direction of rotation; and wherein at least one constricted section of the clamping piece comprises at least three sheet metal disc segments are arranged so that they can move freely in relation to each other in a 120° symmetry.

* * * * *